April 9, 1968 A. KEUSCH 3,377,458

PERCUSSION WELDING APPARATUS

Filed June 12, 1964 3 Sheets-Sheet 2

INVENTOR
ANDREAS KEUSCH
By- Smart & Biggar.
ATTORNEYS

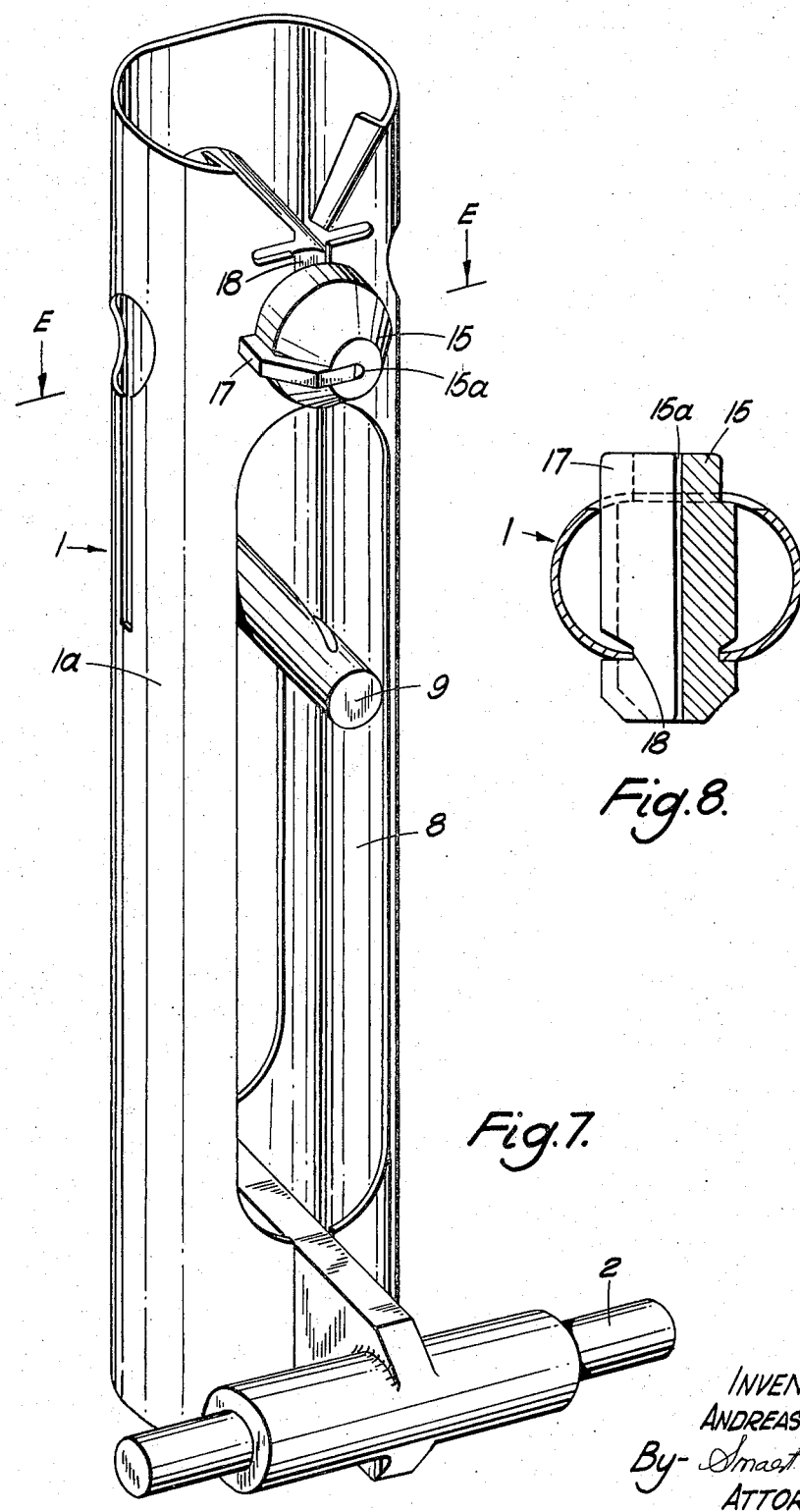

3,377,458
PERCUSSION WELDING APPARATUS
Andreas Keusch, Ville Brossard, Quebec, Canada, assignor to Northern Electric Company Limited, Montreal, Quebec, Canada
Filed June 12, 1964, Ser. No. 374,797
14 Claims. (Cl. 219—95)

ABSTRACT OF THE DISCLOSURE

An apparatus for percussively welding light-weight work pieces, in which a movable work piece clamp, initially held releasably away from a stationary work piece clamp, is propelled, upon release, towards a stationary work piece clamp by a bow spring consisting of an elongated flat strip of resilient metal anchored at the middle and bowed by a fine wire attached to the ends of the strip and to the movable clamp. The movable clamp is a tubular shell of resilient metal pivotally mounted at one end and carrying a work piece-gripping chuck at the other end. The shell is split longitudinally so that by forcing a wedge into the open end of the shell, the chuck is opened to release the work piece.

---

This invention relates to improvements in apparatus for percussively welding workpieces together.

In percussion welding, the resistance of the workpieces to a surge of electric current which forms an arc as they are suddenly forced together causes momentary melting of their contiguous portions, which are immediately united by the force of impact to form an intimate joint. Understandably, the workpieces must be able to withstand this force, the magnitude of which is determined by the momentum of the moving parts at impact. The momentum is a function of the mass, or inertia, of the moving parts and their speed at impact, and, inasmuch as high speed is essential to proper welding, the mass of the moving parts becomes the critical factor when this welding technique is applied to structurally weak workpieces having little resistance to deformation.

Prior percussion welding apparatus inherently had been incapable of successful adaption for such work as, for example, butt welding copper wire of small diameter to electric terminals. In such apparatus, the terminal is held in a stationary clamp and the wire, in a movable clamp, is projected endwise together with the clamp towards the terminal. The driving force is commonly provided by a compression spring arranged with one end in contact with the movable clamp and with the other end abutting a suitable support whereby the spring acts directly on the movable clamp. A trigger device releasably engages and holds the movable clamp with the spring compressed and the workpieces in spaced relation until welding is desired. In addition, the movable clamp carries a mechanism for operating the clamping elements thereof to engage or release the wire. It has been found that this arrangement does not admit of modification to attain the high welding speed and sufficiently low mass of the moving parts which are essential to percussive welding of small wires and the like.

These essential characteristic have been achieved in the percussion welding apparatus of the present invention, which is attributable to the departure in certain aspects from the generally accepted principles of the conventional percussion welding apparatus just described. The apparatus of this invention includes the customary elements which are basic to any apparatus of this type. Separate clamps, one movable with respect to the other, hold the two workpieces to be welded together, and releasable means engage and hold the movable clamp to maintain the workpieces in spaced relation. When released, the movable clamp is moved by driving means to bring the workpieces into percussive welding contact.

One aspect in which the percussion welding apparatus of the present invention differs from known apparatus is in respect of the driving means. An elongated resilient member is mounted intermediate its ends on a support and has a flexible member extending between and connected to said ends. The flexible member in turn is connected intermediate its ends to the movable clamp so as to deform the resilient member transversely when the movable clamp is held by the releasable means. The resiliency of the resilient member causes the flexible member to move the movable clamp, when the latter is released, to bring the workpieces into percussive welding contact as aforesaid. In the preferred embodiment of the invention, the resilient and flexible members comprise a flat strip of spring metal and a wire, respectively, the wire being shorter than the metal strip so as to draw the latter into the form of a bow. The wire is connected at its midpoint to the movable clamp so that the resiliency of the metal strip acting on the movable clamp through the wire causes the movable clamp to be moved in the same manner as an arrow is propelled by a bow. It is evident from the geometry of this arrangement that the midpoint of the wire, and hence the movable clamp and the workpiece held thereby, move a greater distance than the ends of the metal strip. Thus, the driving means of this invention provides higher welding speeds than can be obtained with the prior apparatus in which the movable clamp is acted upon directly by a coil spring and therefore cannot move any faster than the spring itself.

Higher speeds could be achieved in the prior apparatus by providing a system of levers or the like between the driving spring and the movable clamp. However, any such system would introduce unpredictable friction effects and thereby impair the reliability of the apparatus to repeat the desired welding speed with the accuracy which is particularly important when welding very thin wires. A further disadvantage of such an arrangement is that the added mechanism would serve to increase the weight of the moving parts and thereby increase the danger to the workpieces. The welding apparatus in accordance with the invention achieves the speed increase without introducing undesirable friction effects and without increasing the weight of the moving parts.

A further advantage to be gained from the present invention is that the wire does not readily transmit spring vibrations to the movable clamp because the wire is substantially at 90° to the direction of travel of the clamp. Thus, there is les tendency for bounce upon impact of the workpieces than in the prior apparatus where the driving spring and clamp move in the same direction without any means between them for damping the spring vibrations.

In another of its aspects, the persent invention provides an improved percussion welding apparatus in which the movable clamp is an elongated tubular member of resilient material having a discontinuity in its cross-section at one end extending longitudinally of the tubular member. Clamping elements are oppositely mounted on the edges of the tubular member which define this discontinuity, and the elements are adapted to clamp a workpiece therebetween. The tubular member is pivotally supported at its other end so that the one end thereof carrying the clamping elements can be moved with respect to the other clamp to bring the two workpieces into percussive welding contact. There is provided means supported independently of the tubular member which is adapted to engage the tubular member and distort its cross-section so as to separate the clamping elements and thereby release the workpiece.

The present invention will be further illustrated by way of the accompanying drawings in which:

FIGURE 7 is a detailed perspective view of the clamp of FIGURE 1; and

FIGURE 8 is a sectional view taken on the line E—E of FIGURE 7.

Figure 1:
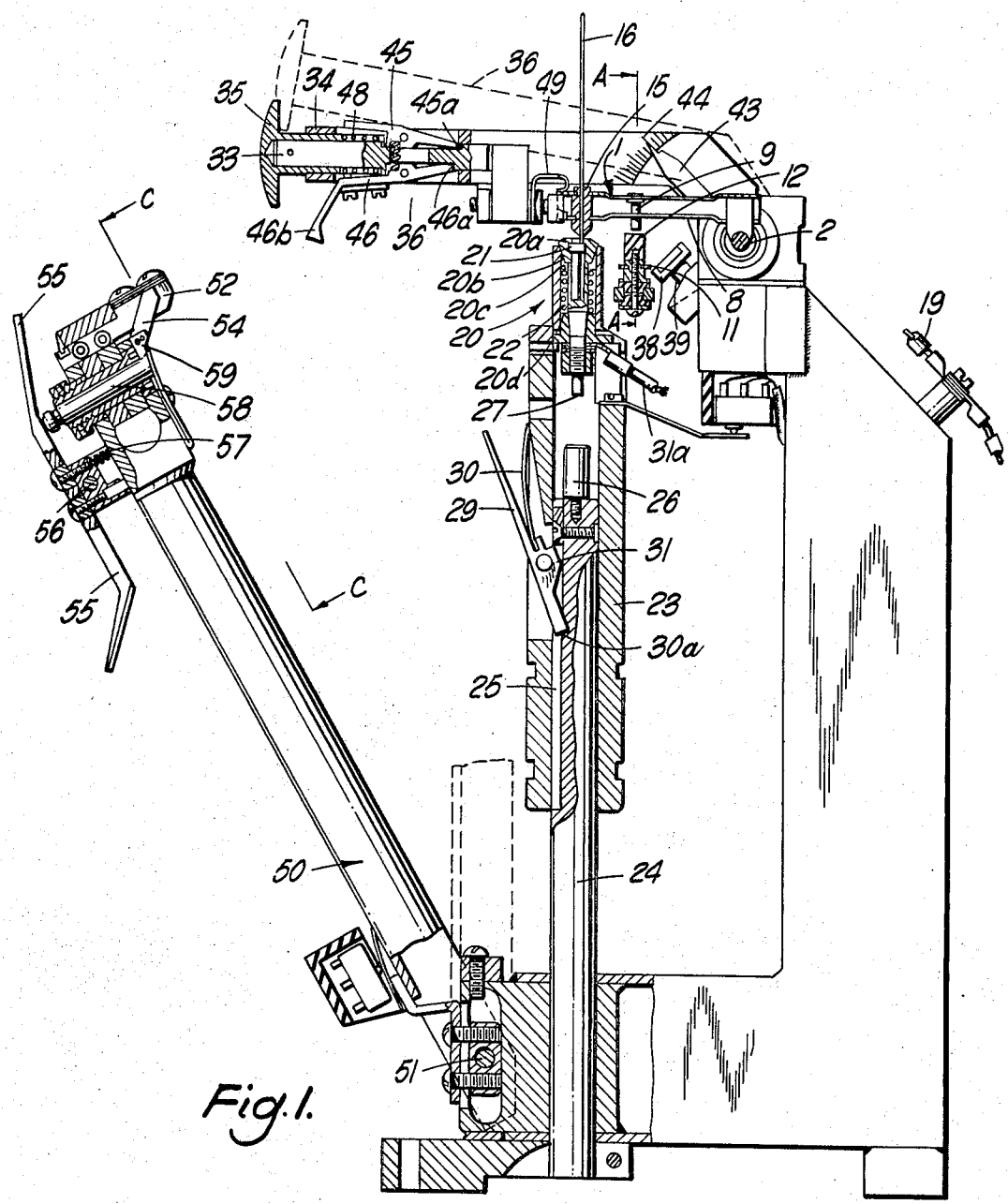
FIGURE 1 is a side elevation partially broken away of a percussion welding apparatus according to one embodiment of the present invention.
Figure 2:
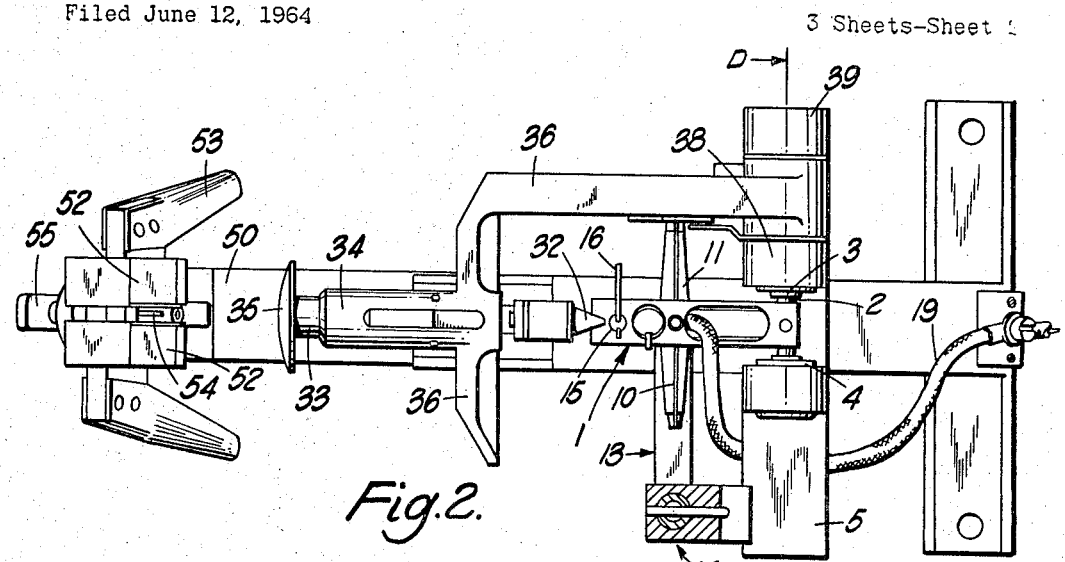
FIGURE 2 is a plan view of the apparatus of FIGURE 1.
Figure 3:
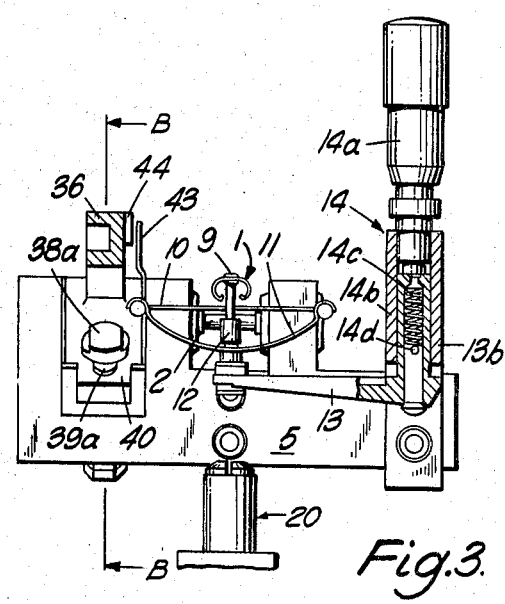
FIGURE 3 is a section taken along the line A—A in FIGURE 1.

With reference to the figures, the clamp 1 which is pivotably mounted on a spindle located in bearings 3 and 4 on platform 5, comprises an elongated tube 1a having a gap 8 in the lower surface thereof and carries a bolt 9 to which is fixed the mid-point of the taut wire 10 of a bow, the resilient bent member 11 of which is rigidly clamped in a support 12. The support 12 is located on an arm 13 which can be raised or lowered by means of a micrometer device 14 mounted on the platform 5 thereby varying the tension in the bow. The micrometer device 14 is formed by a micrometer 14a located by a set-screw (not shown) at the top of a fixed hollow cylinder 14b and depresses a hollow vertical extension 13b of the arm 13 against the action of a spring 14c disposed in said extension 13b. The spring 14c is retained in position by a pin 14d which extends from the fixed cylinder 14b through a slot (not shown) into the hollow extension 13b.

The tube forming the clamp 1 also contains a chuck 15 having a slot 15a through which passes the wire 16 to be welded, the slot also containing a plate 17. The chuck 15 and the plate 17 have a kerf 18 in which kerf the edges of the gap 8 of the tube are located and due to the resiliency of the tube, the plate 17 is urged into the slot 15a thereby clamping the wire 16 in the chuck 15. The inside edge of the plate 17 is knurled to improve the grip of the plate 17 on the wire 16. A cable 19 from a power source (not shown) is seated directly into the chuck 15.

Directly beneath the chuck 15 is collet chuck 20 holding the workpiece 21 to which the wire 16 is to be percussively welded. The chuck 20 is formed of a collet 20a holding the workpiece 21 in a seat 20b, the collet 20a being resiliently held in the seat by a spring 22 located between shoulders 20c on seat 20b and shoulders 20d on the collet 20a.

The collet chuck 20 is integral with a sleeve 23 slidable with respect to an upright support 24 having a longitudinal slot 25 therein. The support 24 has at the top thereof an anvil 26 which is hit by the lower extremity 27 when the sleeve 23 slides down the support 24 thereby lifting the collet 20a against the action of the spring 22 by an amount equivalent to the gap 28 between the shoulders on the collet 20a and the lower edge of the collet seat 20b. On raising the sleeve 23, the collet 20a is urged back into the seat 20b by the spring 22. To hold the sleeve 23 in its upper position, a lever 29 is pivotably mounted in the sleeve 23 and is biased by a spring 30 such that one end of the lever 29 is located in a niche 30a in the slot 25. Further so as to limit the upward traverse of the sleeve 23, the lever 29 has a shoulder 31 which slides in the slot 25 and contacts the upper edge of the slot 25. A cable 31a is connected to the collet 20a from a power source (not shown).

Figure 4:
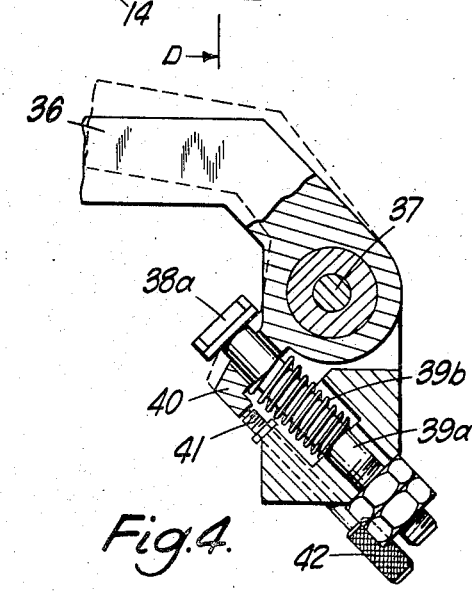
FIGURE 4 is a section taken along the line B—B in FIGURE 3.
Figure 5:
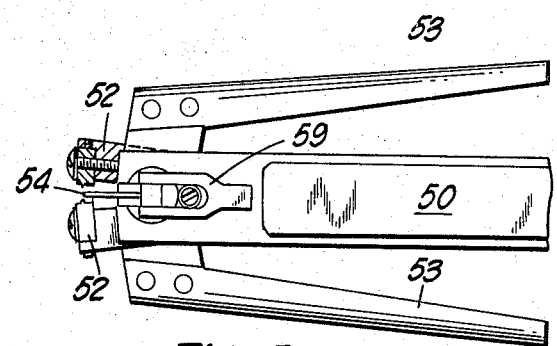
FIGURE 5 is a section taken along the line C—C in FIGURE 1.
Figure 6:
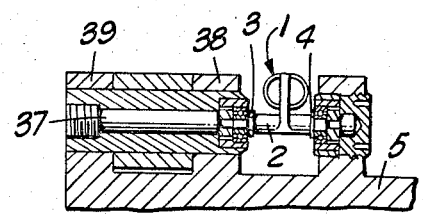
FIGURE 6 is a section taken along the line D—D in FIGURE 2.

For opening the tube of the clamp 1 whereby to release the wire 16 a wedge 32 is offset on the end of a shaft 33 slidable in a cylinder 34 towards and away from the open end of the tube 1a forming the clamp 1, the shaft 33 having at the other end thereof a knob 35. The cylinder 34 is fixedly mounted on an L-shaped arm 36 which is pivotably mounted on a spindle 37 in bearings 38 and 39 on the platform 5. The arm 36 is movable between two positions, the upper position of the arm 36 being determined by the gap between the head 38a of the bolt 39a and the extension 40 of the arm 36 and the lower position being determined by the end 41 of the screw 42 (FIGURE 4). The angle between the two positions of the arm 36 is indicated by the pointer 43 on the scale 44 on the arm 36. The arm 36 is biased by a spring 39b disposed around the bolt 39a into its upper position shown by the dotted lines in FIGURES 1 and 4.

On sliding the shaft 33 from left to right in FIGURE 1 in the cylinder 34 by pushing the knob 35, the shaft 33 is retainable in two positions by means of pawls 45 and 46 which are biased by spring 47 such that they locate in shoulders 45a and 46b respectively on the shaft 33, which shoulders are slightly stepped. Thus when the handle 35 is pushed from left to right in FIGURE 1, the pawls 45 and 46 fall into the shoulders 45a and 46a in the shaft 33 and the shaft 33 is initially retained by the pawl 46 in which position the wedge 32 is fully within the open end of the tube 1a forming the clamp 1 so as to open the tube 1a and release the grip of the chuck 15 on the wire 16. On moving the pawl 46 out from the shoulder 46a by means of the handle 46b, the shaft 33 moves from right to left in FIGURE 1 under the action of the spring 48 and is then held by pawl 45 in shoulder 45a. In this position the wedge 32 is still located in the open end of the tube 1a of clamp 1 but does not open the tube and as such the wire 16 is again gripped by the chuck 15, the wedge 32 merely serving to hold the clamp 1 in position. Finally on removal of the pawl 45 from the shoulder 45a by depression of the other end thereof, the shaft 33 moves from right to left in FIGURE 1 under the action of the spring 48 to its initial position in which the wedge 32 is no longer within the open end of the clamp 1. A spring member 49 is provided to align the wedge 32 and the open end of the tube 1a forming the clamp 1 for entry of the wedge 32 therein.

In order to cut the wire 16 when it has been percussively welded to the workpiece 21, a cutter arm 50 is provided which is pivotable about the pivot 51 and carries a pair of clippers 52 actuable by clipper arms 53. To ensure that the wire 16 is completely severed, a reed 54 is provided to move between the clippers 52 before thy are opened and thereby disturb the cut wire 16 attached to the workpiece 21 to break any remaining connection with the main portion of the wire 16. The reed 54 is actuated by the lever 55 which is pivotable on pivot 56 against a spring 57 and abuts a bolt 58 slidable transversely of the cutter arm 50, the bolt 58 being connected by the bifurcated link 59 to the reel 54.

In operation of the percussion welding device starting where the wire 16 has been welded to the workpiece 21, the arm 36 is in the position shown by the dotted lines in FIGURES 1 and 4 with the shaft 33 in its initial position in which neither of the pawls 45 or 46 are located in their shoulders 45a and 46a.

The arm 36 is firstly moved manually to the horizontal position shown in FIGURE 1 against the spring 39b so that the welge 32 is generally in alignment with the open end of the tube forming the clamp 1 whence the knob 35 is pushed from left to right in FIGURE 1 so that the wedge 32 enters the tube 1a forming the clamp 1 in contact with the lips 1b opens the tube 1a and thus the chuck 15 releases the wire 16. The shaft 33 is held by the pawl 46 so that the wedge is maintained in position and the handle 35 is then released so that the arm 36 returns to the upper position shown by the dotted lines in FIGURE 1 carrying with it the clamp 1 which pivots on spindle 2. When the arm 36 is in this position, the pawl 46 is removed from shoulder 46a whereby the wedge 32 is retracted but is retained in the mouth of the open end of the tube 1a of the clamp 1, but no longer opens the tube 1a and as such the chuck 15 grips the wire 16 once again.

Next the sleeve 23 is manually slid down the support 24, the lever 29 being firstly moved against the spring 30 out of the niche 30a, until the bottom 27 of the collet 20a rests on the anvil 26. The clippers 52 on the arm 50 are then moved into position and the wire 16 cut, the arm 50 then being retracted to its initial position after complete severance of the wire 16 is assured by operation of the reed 54 as aforesaid. The sleeve 23 is then pushed down so that the collet 20a is lifted from its seat 20b against the spring 22 by the contact of its bottom portion 27 with the anvil 26 so that the workpiece 21 with the wire 16 welded thereto may be removed from the collet. A new workpiece 21, e.g. a transistor is then placed in the collet 20a and the sleeve 23 manually slid up the support 24 to its initial position, the lever 29 locating in the niche 30a. The device is onw ready for another percussion weld.

This is effected by removing the pawl 45 from the shoulder 45a whereupon the wedge 32 is removed completely from the clamp 1 and the clamp 1, under the action of the bow formed by wire 10 and resilient member 11, pivots on the spindle 2, and the wire 16 clamped in chuck 15 hits the workpiece 21 to form weld therebetween. The speed of the movement of the chuck 15 in the welding step is thus determined by the tension in the bow.

As aforesaid in order to weld small diameter wires by means of percussion welding it is essential that the movable clamp holding the wire is of low inertia so as to avoid bending or otherwise deforming the wire. This requirement is met in the percussion welding device of the present invention by keeping the number of mechanical elements integral with the clamp 1 necessary for the functioning of the clamp 1 to an absolute minimum. In the appartus of the present invention as shown in the figures, the tube forming the clamp 1 is pivotably mounted, is of light spring steel and serves not only as the supporting structure for the clamping chuck 15 forming the electrode but also serves to supply clamping pressure for the chuck 15. Further the wedge 32 is not integral with the clamp 1 and as such contributes nothing to its weight. By pivotably mounting the clamp 1 as in the preferred embodiment, the energy will be partly transmitted to the wire and partly to the pivot. This provides a further advantage over percussive welding apparatus having a clamp with a longitudinal movement in which all the energy will be transmitted to the wire on impact with the result that the wire will tend to be deformed.

What I claim as my invention is:

1. In a percussion welding apparatus having separate clamps adapted to hold two workpieces to be welded together, one of said clamps being movable with respect to the other to bring the workpieces together into welding contact, and releasable means adapted to engage and hold the movable clamp whereby to maintain the workpiece in spaced relation, the improvement comprising a support, an elongated resilient member mounted intermediate its ends on said support, a flexible member extending between the ends of the resilient member and connected to said ends, said flexible member being connected intermediate its ends to the movable clamp, the resilient member being transversely deformed by the flexible member when the movable clamp is held by the releasable means whereby the movable clamp when released is moved by the flexible member due to the resiliency of the resilient member to bring the workpieces together into percussive welding contact.

2. A percussion welding apparatus as defined in claim 1 in which said support is adapted for adjustment of the position of the resilient member with respect to the movable clamp whereby the degree to which the resilient member is transversely deformed by the flexible member is adjustable as desired.

3. A percussion welding apparatus as defined in claim 2 in which said support comprises a fixed element, a movable element supported by the fixed element and having the resilient member mounted thereon, and micrometer means operatively interconnecting said elements for adjusting the position of the resilient member.

4. A percussion welding apparatus as defined in claim 1 in which the resilient member comprises a flat strip of spring metal mounted at its mid-point on said support, said flexible member comprising a wire connected at its mid-point to the movable clamp, said strip forming a bow when transversely deformed by the wire.

5. In a percussion welding apparatus having separate clamps adapted to hold two workpieces to be welded together, one of said clamps being movable with respect to the other to bring the workpieces into welding contact, releasable means adapted to engage and hold the movable clamp whereby ot maintain the workpieces in spaced relation, and driving means adapted to move the movable clamp when released to bring the workpieces into percussive welding contact, the improvement comprising an elongated tubular member of resilient material forming the movable clamp, said tubular member having a discontinuity in its cross-section at one end, said discontinuity extending longitudinally of the tubular member, separate clamping elements oppositely mounted on the edges of said resilient material defining said discontinuity, said clamping elements being adapted to clamp a workpiece therebetween, means pivotally supporting the other end of the tubular member for movement of said one end with respect to the other clamp for the prescribed purpose, and means supported independently of the tubular member and adapted to engage the latter and distort said cross-section at said one end to separate the clamping elements and thereby release said other workpiece.

6. A percussion welding apparatus as defined in claim 5 in which the tubular member is open at said one end, said discontinuity being a longitudinal slot in the tubular member, and said means for distorting said cross-section comprising a wedge adapted to be forceably inserted into said open one end to expand the tubular member and thereby increase the width of the slot to separate the clamping elements.

7. A percussion welding apparatus as defined in claim 6 in which said releasable means includes a portion adapted to enter said open end of the tubular member, said portion carrying said wedge, said apparatus including operating means adapted to move the releasable means sequentially to four positions: a first position, to forceably insert the wedge and said portion of the releasable means into said open one end of the tubular member when the workpieces have been brought into welding contact whereby said other workpiece is released by the clamping element as aforesaid; a second position to pivot the tubular member about said support means axis to reposition said one end for the clamping elements to receive a new workpiece in spaced relation to a new workpiece clamped by the other clamp; a third position to partially withdraw the wedge from said open one end whereby the clamping elements are permitted to come together to clamp the new workpiece therebetween; and a fourth position to completely withdraw said portion from said open one end whereby the tubular member is released to be pivoted about said supporting means by the driving means to bring the new workpieces into percussive welding contact.

8. A percussion welding apparatus for welding two workpieces together, comprising a clamp for one of said workpieces, an elongated tubular member of resilient material having a discontinuity in its cross-section at one end, said discontinuity extending longitudinally of the tubular member, a pair of clamping elements oppositely mounted on the edges of said resilient material defining said discontinuity, said clamping elements being adapted to clamp the other workpiece therebetween, means pivotally supporting the other end of the tubular member for movement of said one end with respect to said clamp to bring the workpieces into percussive welding contact, releasable means adapted to engage and hold the tubular member whereby to maintain the workpieces in spaced relation, a support, an elongated resilient member mounted intermediate its ends on said support, a flexible member extending between the ends of the resilient member and connected to said ends, said flexible member being connected intermediate its ends to the tubular member, the resilient member being transversely deformed by the flexible member when the tubular member is held by said releasable means whereby the tubular member when released is pivoted about said supporting means by the flexible member due to the resiliency of the resilient member to move said one end for the prescribed purpose, and means supported independently of the tubular member and adapted to engage the latter and distort said cross-section at said one end to separate the clamping elements and thereby release said other workpiece.

9. A percussion welding apparatus as defined in claim 8 in which said support is adapted for adjustment of the position of the resilient member with respect to the tubular member whereby the degree to which the resilient member is transversely deformed by the flexible member is adjustable as desired.

10. A percussion welding apparatus as defined in claim 9 in which said support comprises a fixed element, a movable element supported by the fixed element and having the resilient member mounted thereon, and micrometer means operatively interconnecting said elements for adjusting the position of the resilient member.

11. A percussion welding apparatus as defined in claim 8 in which the resilient member comprises a flat strip of spring metal mounted at its midpoint on said support, said flexible member comprising a wire connected at its midpoint to the movable clamp, said strip forming a bow when transversely deformed by the wire.

12. A percussion welding apparatus as defined in claim 8 in which the tubular member is open at said one end, said discontinuity being a longitudinal slot in the tubular member and said means for distorting said cross-section comprising a wedge adapted to be forceably inserted into said open one end to expand the tubular member and thereby increase the width of the slot to separate the clamping elements.

13. A percussion welding apparatus as defined in claim 11 in which said releasable means includes a portion adapted to enter said open one end of the tubular member, said portion carrying said wedge, said apparatus including operating means adapted to move the releasable means sequentially to four positions; a first position to forceably insert the wedge and said portion of the releasable means into said open one end of the tubular member when the workpieces have been brought into welding contact whereby said other workpiece is released by the clamping elements as aforesaid; a second position to pivot the tubular member about said supporting means to reposition said one end for the clamping elements to receive a new workpiece in spaced relation to a new workpiece clamped by the other element; a third position to partially withdraw the wedge from said open one end whereby the clamping elements are permitted to come together to clamp the new workpieces therebetween; and a fourth position to completely withdraw said portion from said open one end whereby the tubular member is released to be pivoted about said supporting means by the driving means to bring the new workpieces into percussive welding contact.

14. A percussive welding apparatus for welding two workpieces together comprising a clamp for one of said workpieces, an elongated tubular member of resilient material, open at one end and having a longitudinal slot at said end, a pair of clamping elements oppositely mounted on the edges of the slot, said clamping elements being adapted to clamp the other workpiece therebetween, means pivotably supporting the other end of the tubular member for movement of said one end with respect to said clamp to bring the workpieces into percussive welding contact, a fixed element, a moveable element supported by the fixed element, a flat strip of spring metal mounted at its mid-point on said moveable element, a micrometer means operatively interconnecting said elements and adapted for infinite adjustment of the positional relationship between said elements and thereby of said position of the metal strip with a limited range of adjustment, a wire connected to and extending between the ends of the metal strip, said wire being connected intermediate its ends to said moveable clamp and transversely deforming the metal strip to form a bow, and a wedge adapted to enter the open end of the tubular member said wedge being moveable sequentially to four positions; a first position in which the wedge is forceably inserted into the open end of he tubular member when the workpieces have been brought in welding contact whereby to distort the cross-section at said open end to separate the clamping elements and thereby release the other workpiece; a second position in which the tubular member is pivoted about said supporting means to reposition said open end for the clamping elements to receive a new workpiece in spaced relation to a new workpiece clamped by the other element; a third position in which the wedge is partially withdrawn from said open end whereby the clamping elements are permitted to come together to clamp the new workpiece therebetween; and a fourth position in which the wedge is completely withdrawn from the opening of the tubular member whereby the tubular member is released to be pivoted about said supporting means by the bow to bring the workpieces into percussive contact.

References Cited

UNITED STATES PATENTS

| | | | |
|---|---|---|---|
| 1,806,121 | 5/1931 | Siebs | 219—95 |
| 3,073,946 | 1/1963 | Hazel | 219—95 |

RICHARD M. WOOD, *Primary Examiner.*

C. CHADD, *Assistant Examiner.*